(12) United States Patent
Lea et al.

(10) Patent No.: US 8,044,991 B2
(45) Date of Patent: Oct. 25, 2011

(54) LOCAL POSITIONING SYSTEM AND METHOD

(75) Inventors: Scott Lea, Renton, WA (US); Gary E. Georgeson, Federal Way, WA (US); James Troy, Issaquah, WA (US); Marc Matsen, Seattle, WA (US); Jeffrey Hansen, Renton, WA (US); Charles Richards, Kent, WA (US); Matthew W. Smith, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 1061 days.

(21) Appl. No.: 11/863,755

(22) Filed: Sep. 28, 2007

(65) Prior Publication Data
US 2009/0086014 A1 Apr. 2, 2009

(51) Int. Cl.
*H04N 5/14* (2006.01)
*H04N 5/225* (2006.01)
*H04N 5/228* (2006.01)

(52) U.S. Cl. .............. 348/25; 348/207.1; 348/207.11; 348/208.3

(58) Field of Classification Search .............. 348/25, 348/207.1, 207.11, 208.3; 345/419, 427
See application file for complete search history.

(56) References Cited

U.S. PATENT DOCUMENTS

| | | | |
|---|---|---|---|
| 5,590,268 A * | 12/1996 | Doi et al. | 345/419 |
| 5,590,900 A * | 1/1997 | Duran et al. | 280/728.2 |
| 6,697,067 B1 * | 2/2004 | Callahan et al. | 345/427 |
| 2008/0021882 A1 * | 1/2008 | Pu et al. | 707/3 |
| 2009/0086014 A1 * | 4/2009 | Lea et al. | 348/25 |
| 2010/0111501 A1 * | 5/2010 | Kashima | 345/419 |
| 2011/0096149 A1 * | 4/2011 | Au et al. | 348/47 |

FOREIGN PATENT DOCUMENTS
WO PCT/US2008/077178 2/2010

OTHER PUBLICATIONS

Tsai, R. "A versatile Camera Calibration Technique for High-Accuracy 3D Machine Vision Metrology Using Off-the-Shelf TV Cameras and Lenses", IEEE Journal of Robotics and Automation, vol. RA-3, No. 4, pp. 323-344, 1987.
PCT US2008/077178, International Search Report, Nov. 5, 2009.

* cited by examiner

*Primary Examiner* — Quang N. Nguyen
(74) *Attorney, Agent, or Firm* — Tung & Associates

(57) ABSTRACT

A local positioning system which includes a video camera, a computer communicating with the video camera and a target object sighted by the video camera and having a target object coordinate system. The computer is adapted to define a relative position and orientation of the video camera with respect to the target object, determine a position and orientation of the video camera in the target object coordinate system, and determine the position of a point of interest in the target object coordinate system. The system can also be used to aim the camera at a previously recorded point of interest on the target object. Contact with, or close proximity to, the target object is not required. A local positioning method is also disclosed.

19 Claims, 6 Drawing Sheets

LOCAL POSITIONING SYSTEM AND METHOD

TECHNICAL FIELD

The disclosure relates to position measurement for repair and maintenance management of vehicles such as aircraft. More particularly, the disclosure relates to a local positioning system and method for repair and maintenance management of vehicles such as aircraft, using methods that do not require physical contact with the vehicle.

BACKGROUND

When repair work is required on vehicles such as the skin of an aircraft, for example, it may be necessary to take into account the size, shape and location of previous damage and/or repairs for optimum repair of the vehicle. Photographs of the previous damage and/or repair may be made but may not be precisely located or sized on the vehicle or may not be useful for future repair planning. During the analysis of a damage/repair site (i.e. a location of interest) it may be desirable to obtain measurement information without contacting the target object. Due to accessibility and/or contact constraints, it may be difficult to reach the location of interest to obtain position measurements; therefore it is advantageous for a local positioning system to be able to take measurements without contacting the target object and from moderate to large distances from the target object. Local positioning systems which have been used to determine the location, shape and size of damage and/or repairs on vehicles, such as skin damage and/or repairs on an aircraft, for example, may utilize acoustic, laser-based, magnetic, RFID, GPS, and motion capture -based systems. A local positioning system such as the Hexamite HX11, for example, may utilize a minimum of four wireless acoustic sensors (and may require line-of-site) to provide 3-D positioning capability of past damage and/or repairs. The sensors may require mounting on the aircraft with the fourth sensor used to generate point data. Also, curvature of any sort on the surface of the aircraft distorts the acoustic path and reduces the precision to the point that this method will not work in many cases.

Laser-based positioning systems may stand off the aircraft structure to take location data on an aircraft, but may suffer from the requirement that the laser beam be directed in a somewhat perpendicular orientation with respect to the surface of the aircraft skin in order to obtain a sufficiently strong reflection to be recorded. 3A lasers may not be sufficiently strong for use beyond a few feet on most colors of paint, and the stronger 3B lasers may require optical shielding for eye safety.

Other laser-based systems, like the ArcSecond® or Leica Geosystems® trackers, require receivers or reflectors placed at locations of interest. In the case of the ArcSecond system, multiple laser emitters must be placed around the work volume, which increases process complexity and data collection effort of the user.

In a similar manner, motion capture (MoCap) systems, like those from Vicon® or Motion Analysis®, Inc., also require the placement of components around the work volume, in this case multiple camera units, and also require the placement of markers on the target object Magnetic systems, like those from Ascension®, require placement of magnetic sensors and tend to have accuracy problems due to interference from metal.

GPS and active RFID-based systems don't have the necessary resolution, and also require device placement on the target object.

The capability to rapidly tie features on a vehicle such as on the skin of an aircraft (size, shape and location of structural damage or non-destructive evaluation (NDE) associated to structural damage or the repair of previous structural damage), for example, to coordinate systems may be useful in some circumstances. There may be a need in some circumstances to obtain positional and geometric data in order to establish the appropriate repair design and procedure based upon precise history of past repairs on a particular portion of a vehicle and to relate the data to an engineering data set and maintenance database.

SUMMARY

The disclosure is generally directed to a local positioning system and method. An illustrative embodiment of the local positioning system includes a video camera, a computer communicating with the video camera and a target object sighted by the video camera and having a target object with visible features of known position in the object's coordinate system. Computer software determines the position and orientation of the video camera in the coordinate system of the target object, and determines the position of points of interest in the coordinate system of the target object. This is a measure-at-a-distance process that can be accomplished without contacting the target object.

BRIEF DESCRIPTION OF THE ILLUSTRATIONS

DETAILED DESCRIPTION

Figure 1:
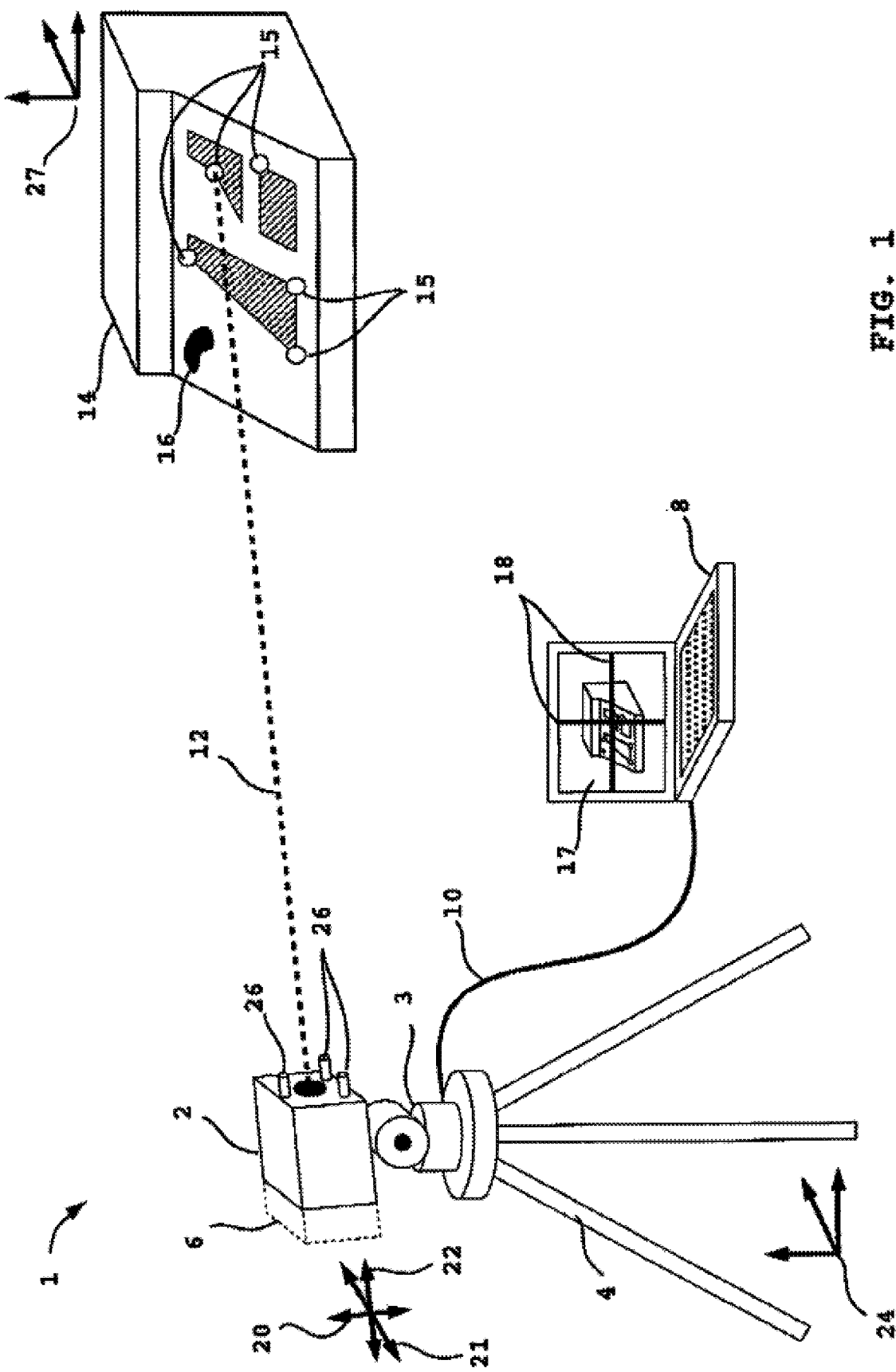
FIG. 1 is a partially schematic perspective view of an illustrative embodiment of the local positioning system.

Referring initially to FIG. 1, an illustrative embodiment of the local positioning system, hereinafter system, is generally indicated by reference numeral 1. The system 1 may include a video camera 2 which may have automated (remotely controlled) zoom capabilities. In one particular embodiment, camera 2 is a FCB-EX1010 camera from Sony Electronics® Inc. The video camera 2 may additionally include an integral crosshair generator to facilitate precise locating of a point within an optical image field display 17 of the video camera 2. In applications in which the crosshair generator is not an integral component of the video camera 2, a crosshair generator 6 (shown in phantom) may be connected to the video camera 2 as a separate element for this purpose or overlaid on the video stream on the PC or display device.

The video camera 2 may be provided on a pan-tilt mechanism 3 which may be mounted on the tripod support 4 or alternative support. In one particular embodiment, the pan-tilt mechanism 3 is the PTU-D46-70 by Directed Perception®. The pan-tilt mechanism 3 may be capable of positionally adjusting the video camera 2 to selected angles around the vertical, azimuth (pan) axis 20 and the horizontal, elevation (tilt) axis 21, as well as rotation of the video camera 2 to selected angles about a roll camera axis 22. For the implementation discussed here, measurement and control of the roll axis is not required.

A direction vector that describes the orientation of the camera relative to the fixed coordinate system 24 of the tripod 4 (or other platform on which the pan-tilt unit is attached) is determined from the azimuth and elevation angles, as well as the position of the center of crosshair marker in the optical field when the camera is aimed at a point of interest 16. For simplicity, we are using the center of the image for the location of the crosshair display, but other locations could be used provided that the angles are modified to compensate for the difference. This direction vector can be thought of as a line 12 extending from the lens of the camera and intersecting a location 15 on target object 14.

The video camera 2 and the pan-tilt mechanism 3 may be operated by a computer 8 which may be a notebook computer, for example. The computer 8 may communicate with the video camera 2 and the pan-tilt mechanism 3 through a video/control cable 10. Alternatively, the computer 8 may communicate with the video camera 2 and the pan-tilt mechanism 3 through a wireless communication pathway (not shown). Alternatively, the computer may be integrated with the camera. Control of the pan-tilt mechanism 3 and therefore, the orientation of the video camera 2 may be controlled using the computer 8 keyboard, mouse (not shown), track ball (not shown), or other input device. The optical image field 17, with crosshair overlay 18, is sighted by the video camera 2 may be displayed on the monitor of the computer 8.

Three-dimensional localization software may be loaded onto the computer 8. The 3-D localization software may use multiple calibration points 15 at a distance on an target object 14 such as an aircraft, for example, to define the location (position and orientation) of the video camera 2 relative to the target object 14. In some applications, the 3D localization software may utilize a minimum of three calibration points 15 on the target object 14, in combination with pan and tilt data from the pan-tilt mechanism 3, to define the relative position and orientation of the video camera 2 with respect to the target object 14. The calibration points 15 may be visible features of known position in the local coordinate system of the target object 14 as determined from a 3-D CAD model or other measurement technique. The calibration points 15 may be used in coordination with the azimuth and elevation angles from the pan-tilt mechanism 3 to solve for the camera position and orientation relative to the target object.

Once the position and orientation of the video camera 2 with respect to the target object 14 is determined, the computer 8 may be operated to rotate and zoom the optical image field of the video camera 2 to a desired location 16 of unknown position on the target object 14, which may be a damage/repair location on an aircraft, for example. At this position of the direction vector, the orientation of the video camera 2 (which may include the angle of the video camera 2 along the azimuth axis 20 and the elevation axis 21) may be recorded. By using the azimuth and elevation angles from the pan-tilt unit and the relative position and orientation of the camera determined in the calibration process, the location of the point of interest 16 can be determined relative to the coordinate system 27 of the target object 14. The damage/repair location 16 on the target object 14 may be sized by aligning the crosshairs 18 in the optical image field of the video camera 2 along the boundary of the damage/repair location.

The reverse process, in which the position of a point of interest 16 may be known in the target object's coordinate system (from a previous data acquisition session, a CAD model, or other measurement), can also be performed. In this situation, the camera may be placed in any location the work area where calibration points are visible (which may be in a different location than the location where the original data was recorded) and the camera pose calibration step may be performed. The direction vector 12 from the point of interest to the camera may be calculated in the target object's coordinate system 27. The inverse of the camera pose transformation matrix may be used to convert the direction vector into the coordinate system of the camera. The azimuth and elevation angles may then be calculated and used by the pan-tilt unit to aim the camera at the point of interest on the target object.

In some applications, at least one (such as three, for example) laser pointer 26 may be mounted on the camera and aligned with the direction vector 12. The at least one laser pointer 26 may provide a visual indication on the target object 14 as to the aim or direction of the video system 2. This sighting feature provided by the laser pointers 26 may be helpful in aiding rapid selection of positional calibration points 15 and points of interest 16 on the target object 14, since the intersection of the laser beams (not shown) emitted from the laser pointers 26 with the target object 14 are visible to the naked eye. Use of the laser pointers can also be useful when recalling points in the target object's coordinate system (which could be previous repair locations or other points of interest) by showing the location on the target object.

In alternate embodiments of this concept, the camera may be replaced with an optical instrument, like a telescope. Also the automated (motor driven) pan-tilt mechanism could be replaced by one that can be positioned manually. The only functional requirement is that the azimuth and elevation angles can be read and entered into the localization application.

In another alternate embodiment of this concept, the system can be integrated into an application connected to the internet, such as a Web-enabled application, which could be either wired or wireless. In this type of application, remote users, or other automated software agents, can operate the camera and pan-tilt unit, and then receive the processed localization data for objects within visual range of the system.

In typical implementation of the system 1, the video camera 2 may be set up within about 40-50 feet of the target object 14. The target object 14 may be the skin of an aircraft, for example and without limitation. The calibration points 15 on the target object 14 may be selected and used by the 3-D localization software loaded onto the computer 8 in conjunction with the pan and tilt data (i.e., the azimuth and elevation angles) from the pan-tilt mechanism 3 to determine the position and orientation of the video camera 2 with respect to the target object 14. The calibration points 15 may be feature points of known position in the local coordinate system of the target object 14 as determined from a 3-D CAD model or other measurement technique. In some implementations, the pan-tilt unit 3 may be attached to a portable support, such as a tripod or other mobile device. In other implementations, the pan-tilt unit could be attached to stationary support, such as the walls of an airplane hangar.

The 3-D localization software loaded onto the computer 8 may determine the position and orientation of the video camera 2 with respect to the target object 14 and generate a camera pose transformation matrix using one of three methods: (1) vector-based approach; (2) position and orientation based on 5-point technique or 7-point techniques; and (3) laser hybrid system. The vector-based approach may utilize three calibration points 15 on the target object 14 and solves simultaneous equations to determine the position of the video camera 2 with respect to the target object 14. This assumes the relative orientation of the camera is known. The position and orientation calibration based on 5-point or 7-point techniques may determine both the position (x, y, z) and the orientation (roll, pitch, yaw) of the video camera 2 relative to the target object 14. The 5-point method may utilize five known calibration points 15 that all lie on the same planar surface of the target object 14. The 7-point method may utilize seven known calibration points 15 that are not all on the same planar surface of the target object 14. One particular embodiment of the process uses a modified version of the 5- and 7-point methods as described by the following publication (incorporated herein by reference): Tsai, R., "A Versatile Camera Calibration Technique for High-Accuracy 3D Machine Vision Metrology Using Off-the-Shelf TV Cameras and Lenses", IEEE Journal of Robotics and Automation, Vol. RA-3, No. 4, pp 323-344, 1987. It has been modified to use pan-tilt data instead of pixel location data to accomplish the calibration process.

In alternate embodiments, an off-the-shelf laser-based distance measurement device (not shown) may be integrated into the system to create a laser hybrid system, which may be incorporated onto the pan-tilt mechanism 3 and may use measurement data from the laser to obtain an estimate of the distance from the video camera 2 to the calibration points 15 on the target object 14. In this configuration, the distance data from the optional laser-based distance measurement device may be used in combination with the vector and 5-point/7-point techniques to provide a more accurate calculation, in some conditions, of the position and orientation of the camera relative to the target object, as well as determining the location of points of interest on the target object. Note that this optional laser-based distance measurement device is not the same as the optional laser pointer 26.

In alternate embodiments, the localization software may be written into firmware on a chip for use in embedded applications without requiring the use of a PC.

Once the position and orientation of the video camera 2 with respect to the target object 14 are determined and the camera pose transformation matrix generated, camera pan data (angle of rotation of the video camera 2 about the azimuth axis 20) and tilt data (angle of rotation of the video camera 2 with respect to the elevation axis 21) may be used in conjunction with the calculated position and orientation of the video camera 2 to determine the X, Y and Z positions of any point of interest (such as the damage/repair location on the skin of the aircraft) on the target object 14 in the coordinate system of the target object 14. The video camera 2 may then be aimed at the damage/repair location on the target object 14, with the center and/or outline of the damage/repair location defined. Although not required for all situations, reflective tape (not shown) may be provided on feature locations used for calibration and on or around the edges or perimeter of the damage/repair location to assist the optional laser-based distance measurement device in achieving a more visible reflection from the damage-repair location.

Because the position of the damage/repair location on the target object 14 may not initially be known, the pan and tilt angles of the pan-tilt mechanism 3 may be used to determine the direction vector in the local camera coordinate system of the video camera 2. Determination of the surface position of the damage/repair location may be made by any one of the following methods: 1. an approximation using the ray intersection from a polygonal surface formed from the calibration points, or other user selected features of know position on the target object; 2. 3-D data from a CAD model, for example; 3. the distance from the optional laser-based measurement device. At this step, the camera pose transformation matrix may be used to transform or convert the damage/repair location, which is initially defined in the local camera coordinates, into the coordinate system of the target object 14.

The 3-D model coordinate system and maintenance database of the target object 14 may then be accessed by the computer 8 to locate previous locations of damage, repairs and/or other issues on the target object 14. Present repair of the damage/repair location on the target object 14 may then be planned and completed based on the positional and geometric relationships of the previous damage, repairs and/or issues with the damage/repair location. The positional and geometric information of the video camera 2 when the optical image field of the video camera 2 is aimed at the damage/repair location may be saved and superimposed on the 3-D model, which may be maintained in a database. Digital photographs of the damage/repair location may additionally be taken using the video camera 2 or other camera and saved in the database. Accordingly, the updated database is available in the event that a subsequent repair of the target object 14 is necessary.

Figure 2:
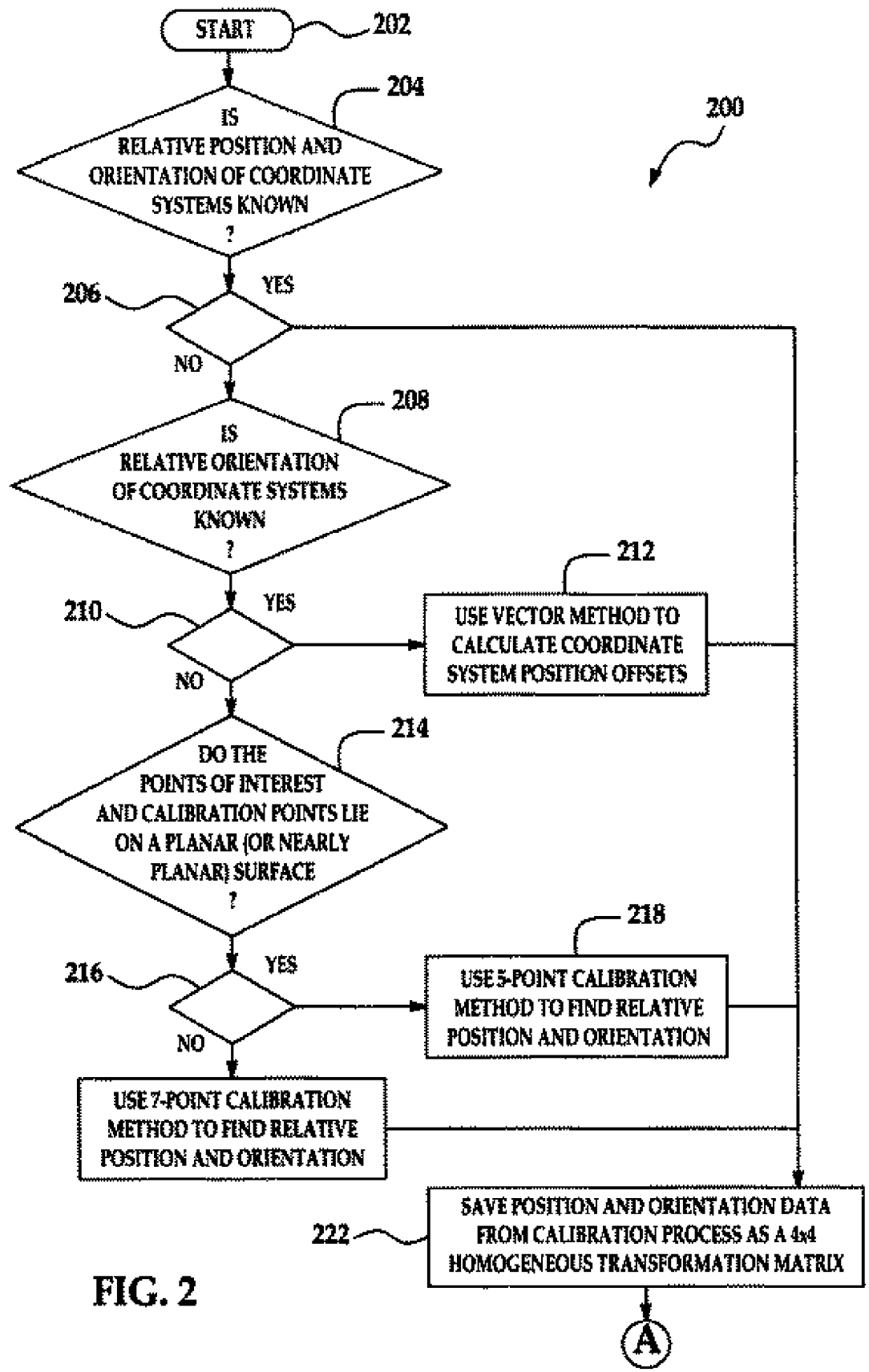
FIG. 2 is a flow diagram which illustrates steps implemented to generate a camera pose transformation matrix.

Referring next to FIG. 2, a flow diagram 200 which illustrates steps implemented to generate a camera pose transformation matrix is shown. The method 200 begins at block 202 in FIG. 2. In block 204, a determination may be made as to whether the relative position and orientation of coordinate systems is known. If the answer to the query posed in block 204 is "yes" in block 206 (the position and orientation of the camera coordinate system relative to the target object is known), then the position and orientation data from the calibration process may be saved for the camera pose as a 4×4 homogeneous transformation matrix in block 222.

If the answer to the query posed in block 204 is "no" in block 206 (at least one of the relative position and orientation of coordinate systems is unknown), then a determination may be made as to whether the relative orientation of coordinate systems is known in block 208. If the answer to the question posed in block 208 is "yes" in block 210 (the relative orientation of coordinate systems is known), then a vector method may be used to calculate coordinate system position offsets in block 212. If the answer to the question posed in block 208 is "no" in block 210 (the relative orientation of coordinate systems is not known), then a determination may be made in block 214 as to whether the calibration points and the points of interest lie on a planar or nearly planar surface.

If the answer to the query posed in block 214 is "yes" in block 216 (the points of interest and the calibration points do lie on a planar or nearly planar surface), then a 5-point calibration method may be used to find both the position and orientation of the camera relative to the target object in block 218. If the outcome of the query which is posed in block 214 is "no" in block 216 (the points of interest and the calibration points do not lie on a planar or nearly planar surface), then a 7-point calibration method may be used to find the position and orientation camera relative to the target object in block 220. The method may then proceed to block 222, in which the position and orientation data from the calibration process may be saved for the camera pose as a 4×4 homogeneous transformation matrix.

Figure 3:
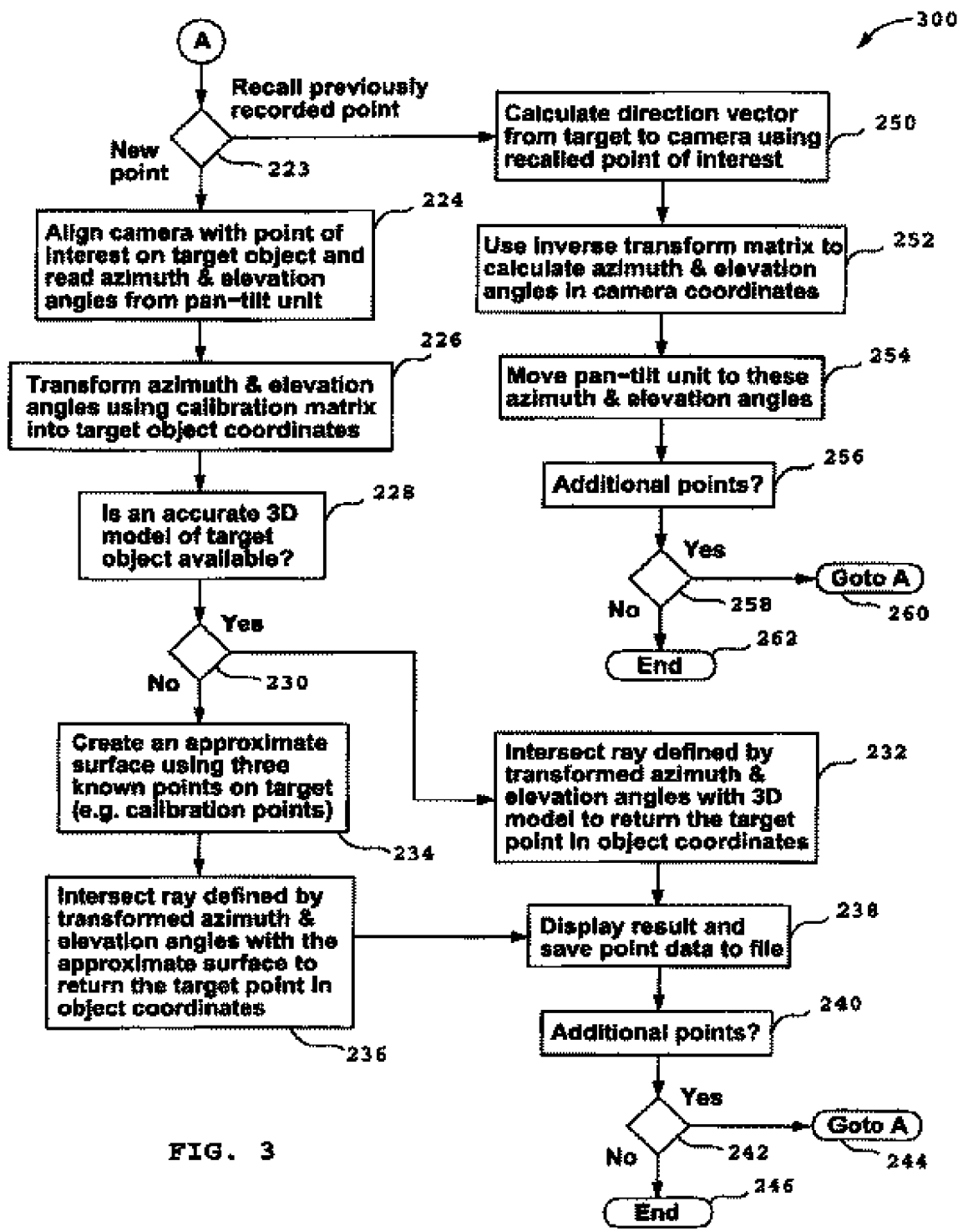
FIG. 3 is a continuation of the flow diagram of FIG. 2 which illustrates steps implemented to locate a desired position on a target object.

Referring next to FIG. 3, a flow diagram 300, which is a continuation of the flow diagram in FIG. 2, illustrates steps implemented to locate a desired position of interest on a target object is shown. After the position and orientation data from the calibration process are saved for the camera pose as a 4×4 homogeneous transformation matrix in block 222 of FIG. 2, if the answer to the query posed in block 223 is "new point", then in block 224 a camera may be aligned by the pan-tilt unit with a point of interest on a target object and the azimuth and elevation angles of the camera (which defines the direction vector 12 of FIG. 1) may be determined. In block 226, the azimuth and elevation angles determined in block 222 may be transformed into target object coordinates using the calibration matrix which was saved in block 222 of FIG. 2. In block 228, a determination is made as to whether an accurate three-dimensional model of the target object is available. If an accurate 3-D model of the target object is available in block 230, then the direction vector 12 defined by the transformed azimuth and elevation angles, may be transformed into the coordinate system of the target object by the calibration matrix and then is intersected with the 3-D model of the target object to return the target point in object coordinates in block 232. The result of the calculation made in block 232 may be displayed and the point data may be saved to file in block 238. In block 240, a query may be made as to whether additional points of interest on the target object are necessary. If additional points of interest on the target object are necessary (block 242), then the method may return to block 224 via block 244. If additional points of interest on the target object are not necessary (block 242), then the method may end at block: 246.

If the answer to the query posed in block 228 is "no" in block 230 (an accurate 3-D model of the target object is not available), then an approximate surface using three known points (such as calibration points) on the target object may be created in block 234. Next, in block 236 the direction vector 12 which is defined by the azimuth and elevation angles is transformed by the calibration matrix save in block 222 and is then intersected with the approximate surface which was created in block 234 to return the target point in object coordinates. The result of the calculation made in block 236 may be displayed and the point data may be saved to file in block 238. In block 240, a query may be made as to whether additional points of interest on the target object are necessary. If the answer to the query posed in block 240 is "yes" in block 242 (additional points of interest on the target object are necessary), then the method may return to block 223 via block 244. If the answer to the query posed in block 240 is "no" in block 242 (additional points of interest on the target object are not necessary), then the method may end at block 246.

If the answer to the query posed in block 223 is "recall previously recorded point", then the desired point of interest is from entered (e.g. selected from the CAD model, entered from the keyboard, or recalled from storage in another manner) and is used to calculate the direction vector 12 from the position on the target object to the camera in block 250. This direction vector is then converted into azimuth and elevation angles in camera coordinates using the inverse of the camera calibration transformation matrix in block 252. The pan-tilt unit is then moved to these angles in block 254. In block 256, a query may be made as to whether additional points of interest on the target object are necessary. If the answer to the query posed in block 256 is "yes" in block 258 (additional points of interest on the target object are necessary), then the method may return to block 223 via block 260. If the answer to the query posed in block 256 is "no" in block 258 (additional points of interest on the target object are not necessary), then the method may end at block 262.

Figure 4:
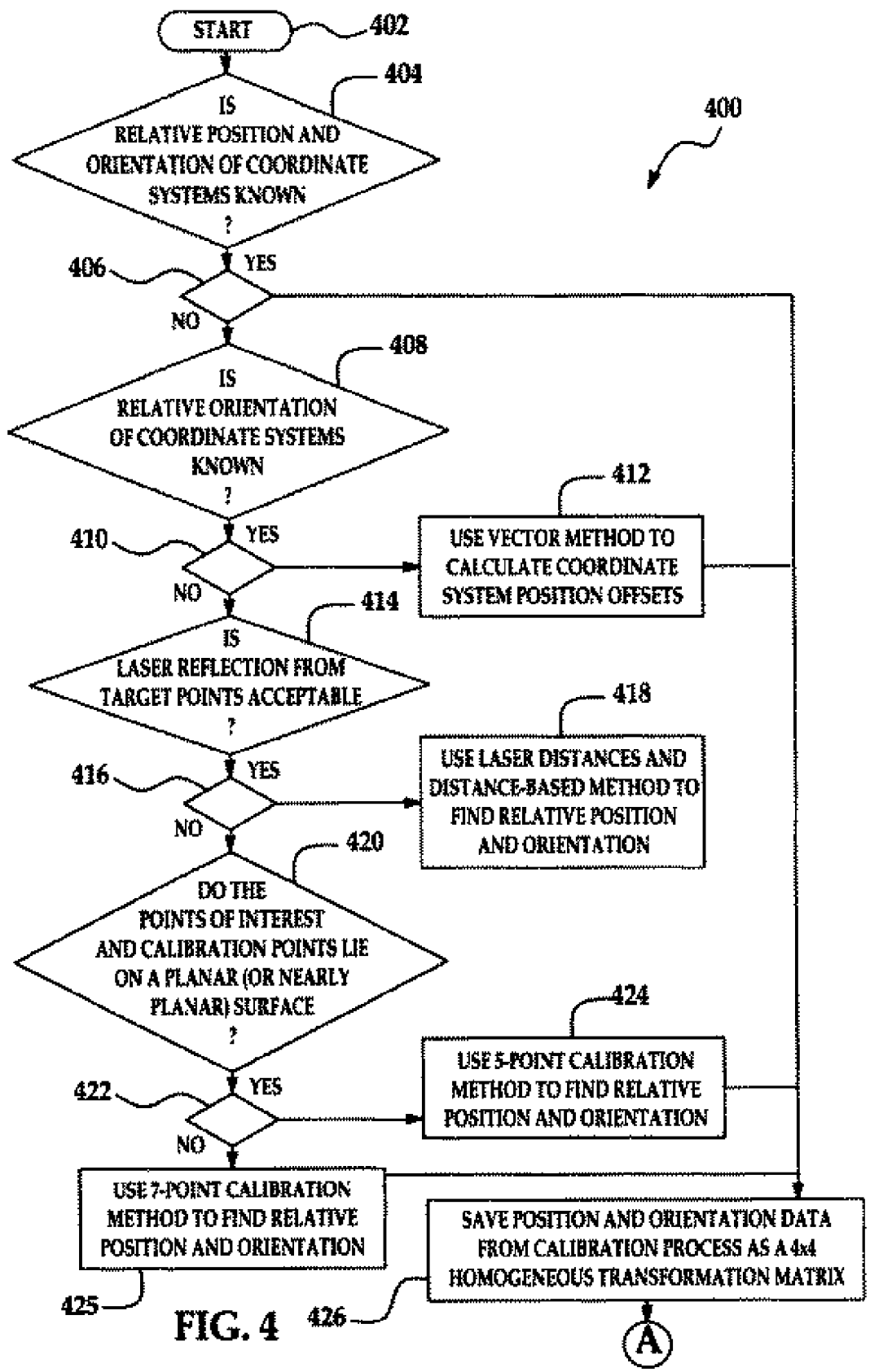
FIG. 4 is a flow diagram which illustrates alternative steps implemented to generate a camera pose transformation matrix.

Referring next to FIG. 4, a flow diagram 400 which illustrates steps implemented to generate a camera pose transformation matrix according to an alternative illustrative embodiment of the repair and maintenance method is shown. The method 400 begins at block 402 in FIG. 4. In block 404, a determination is made as to whether the relative position and orientation of coordinate systems is known. If the answer to the query in block 404 is known in block 406, then the position and orientation data from the calibration process may be saved as a 4×4 homogeneous transformation matrix in block 426.

If the answer to the query posed in block 404 is "no" in block 406 (at least one of the relative position and orientation of coordinate systems is unknown), then a determination may be made as to whether the relative orientation of coordinate systems is known in block 408. If the answer to the question posed in block 408 is "yes" in block 410 (the relative orientation of coordinate systems is known), then a vector method may be used to calculate coordinate system position offsets in block 412. If the answer to the question posed in block 408 is "no" in block 410 (the relative orientation of coordinate systems is not known), then a determination may be made in block 414 as to whether laser reflections from target points on a target object are acceptable.

If the answer to the query posed in block 414 is "yes" in block 416 (the laser reflections from the target points on the target object are acceptable), then the laser distances and a distance-based method may be used to find both the relative position and orientation of camera relative to the target object in block 418. If the outcome of the query which is posed in block 414 is "no" in block 416 (the laser reflections from the target points on the target object are not acceptable), then a query is made as to whether the calibration points and the points of interest lie on a planar or nearly planar surface. If the answer to the query posed in block 420 is "no" in block 422 (the calibration points and the points of interest do lie on a planar or nearly planar surface), then a 5-point calibration method may be used to find the position and orientation of the camera relative to the target object in block 424. The method may then proceed to block 426, in which the position and orientation data from the calibration process may be saved as a 4×4 homogeneous transformation matrix. If the answer to the query posed in block 420 is "no" in block 422, then a 7-point calibration method may be used to find the position and orientation of the camera relative to the target object in block 425. The method may then proceed to block 426, in which the position and orientation data from the calibration process may be saved as a 4×4 homogeneous transformation matrix.

Figure 5:
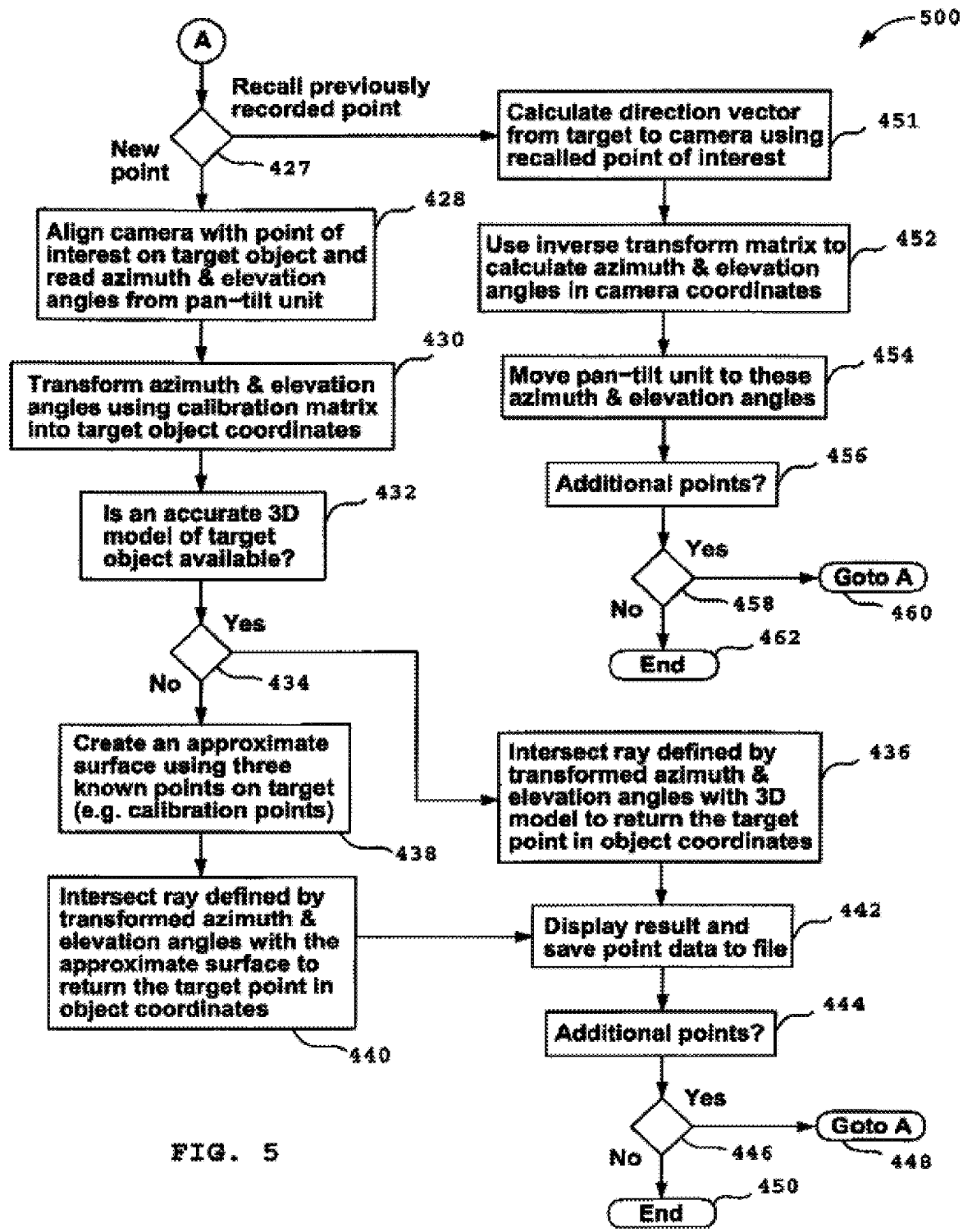
FIG. 5 is a continuation of the flow diagram of FIG. 4 which illustrates steps implemented to locate a desired position on a target object.

Referring next to FIG. 5, a flow diagram 500, which is a continuation of the flow diagram in FIG. 4, illustrates steps implemented to locate a desired position of interest on a target object is shown. After the position and orientation data from the calibration process are saved as a 4×4 homogeneous transformation matrix in block 426 of FIG. 4, if the answer to the query posed in block 427 is "new point", then in block 428 a camera may be aligned by the pan-tilt unit with a point of interest on a target object and azimuth and elevation angles of the camera (which defines the direction vector 12) may be determined. In block 430, the azimuth and elevation angles determined in block 428 may be transformed into target object coordinates using the calibration matrix which was saved in block 426 of FIG. 4. In block 432, a determination is made as to whether an accurate three-dimensional model of the target object is available. If the answer to the query posed in block 432 is "yes" in block 230 (an accurate 3-D model of the target object is available), then direction vector 12 defined by the azimuth and elevation angles, is transformed into the coordinate system of the target object by the calibration matrix and is then intersected with the 3-D model of the target object to return the target point in object coordinates in block 436. The result of the calculation made in block 436 may be displayed and the point data may be saved to file in block 442. In block 444, a query may be made as to whether additional points of interest on the target object are necessary. If additional points of interest on the target object are necessary (block 446)), then the method may return to block 427 via block 448. If additional points of interest on the target object are not necessary (block 446), then the method may end at block 450.

If the answer to the query posed in block 427 is "recall previously recorded point", then the desired point of interest is from entered (e.g. selected from the CAD model, entered from the keyboard, or recalled from storage in another manner) and is used to calculate the direction vector 12 from the position on the target object to the camera in block 451. This direction vector is then converted into azimuth and elevation angles in camera coordinates using the inverse of the camera calibration transformation matrix in block 452. The pan-tilt unit is then moved to these angles in block 454. In block 456, a query may be made as to whether additional points of interest on the target object are necessary. If the answer to the query posed in block 456 is "yes" in block 458 (additional points of interest on the target object are necessary), then the method may return to block 427 via block 460. If the answer to the query posed in block 456 is "no" in block 458 (additional points of interest on the target object are not necessary), then the method may end at block 462.

If the answer to the query posed in block 432 is "no" in block 434 (an accurate 3-D model of the target object is not available), then an approximate surface using three known points (such as calibration points) on the target object may be created in block 438. Next, in block 440 the direction vector 12, which is defined by the transformed azimuth and elevation angles, may be transformed by the calibration matrix saved in block 426 and then intersected with the approximate surface which was created in block 438 to return the target point in object coordinates. The result of the calculation made in block 440 may be displayed and the point data may be saved to file in block 442. In block 444, a query may be made as to whether additional points of interest on the target object are necessary. If the answer to the query posed in block 444 is "yes" in block 446 (additional points of interest on the target object are necessary), then the method may return to block 428 via block 448. If the answer to the query posed in block 444 is "no" in block 446 (additional points of interest on the target object are not necessary), then the method may end at block 450.

Figure 6:
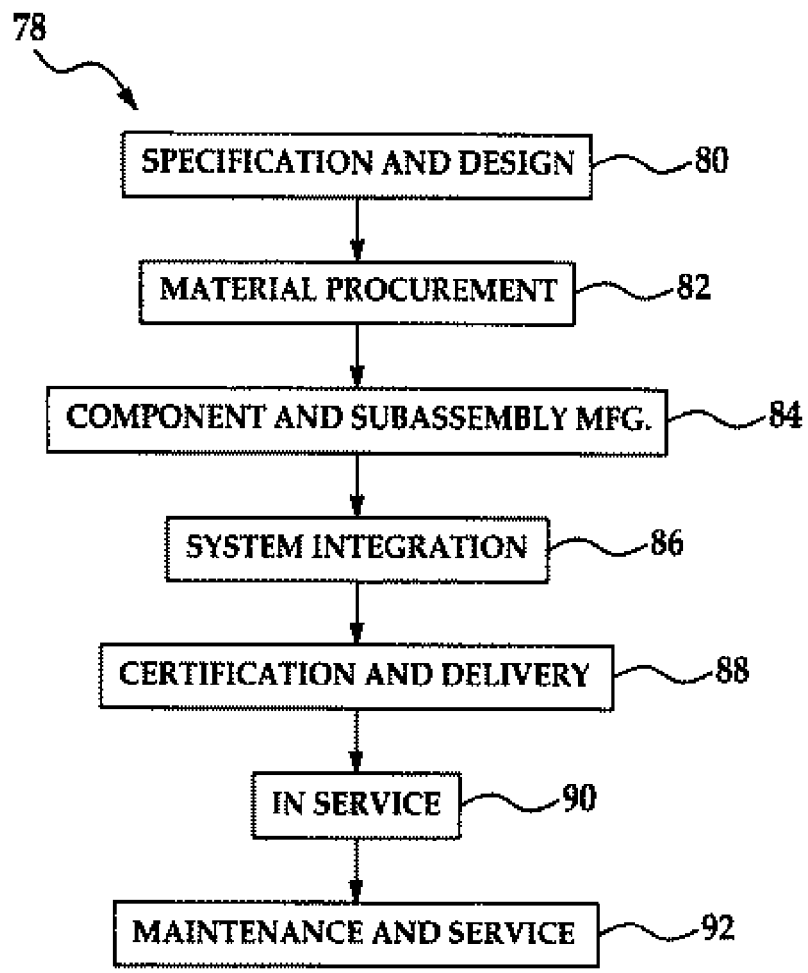
FIG. 6 is a flow diagram of an aircraft production and service methodology.
Figure 7:
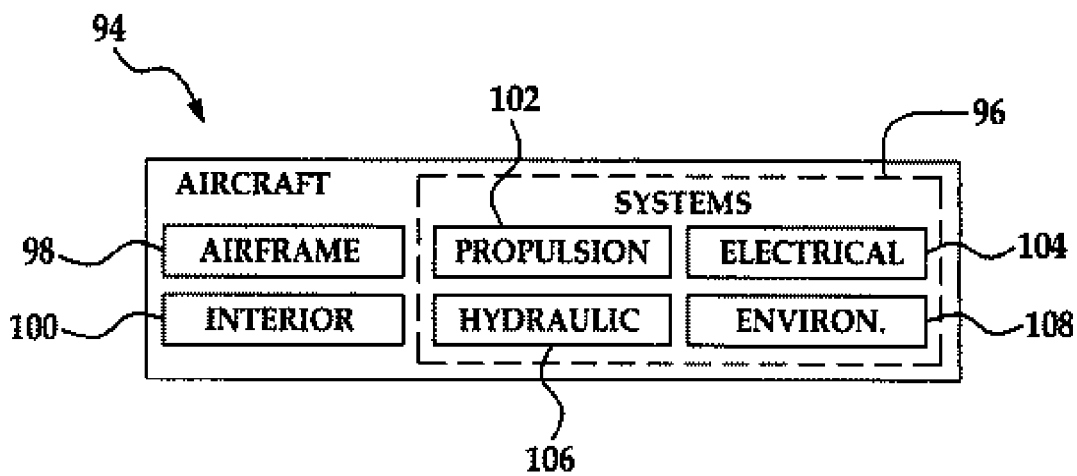
FIG. 7 is a block diagram of an aircraft.

Referring next to FIGS. 6 and 7, embodiments of this invention may be used in the context of an aircraft manufacturing and service method 78 as shown in FIG. 6 and an aircraft 94 as shown in FIG. 7. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 is scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the disclosure may be applied to other industries, such as the automotive, architectural, and ship building industries.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92. One or more apparatus embodiments may be used as part of a real-time airplane health management system.

Although this disclosure has been described with respect to certain exemplary embodiments, it is to be understood that the specific embodiments are for purposes of illustration and not limitation, as other variations will occur to those of ordinary skill in the art.

What is claimed is:

1. A local positioning system, comprising:
a support;
a pan-tilt mechanism carried by said support;
a video camera carried by said pan-tilt mechanism;
said pan-tilt mechanism is adapted to pan and tilt said video camera;
a computer communicating with said video camera and said pan-tilt mechanism;
a target object sighted by said video camera and having a point of interest to be measured and a target object coordinate system;
said computer is adapted to define a relative position and orientation of said video camera with respect to said target object, determine a position and orientation of said video camera in said target object coordinate system, and determine a position of said point of interest in said target object coordinate system;
said computer is adapted to retrieve a three-dimensional model of said target object and display said target object coordinate system and said point of interest on said three-dimensional model of said target object; and
said computer is adapted to indicate locations of previously recorded points of interest comprising previous repair locations of said target object on said three-dimensional model of said target object.

2. The system of claim 1 wherein a localization application is programmed into firmware on an ASIC (application specific integrated circuit) or FPGA (field programmable gate array) in place of software from said computer.

3. The system of claim 1 further comprising at least one laser pointer provided on said video camera.

4. The system of claim 1 wherein said computer is adapted to save digital photographs of said previous repairs of said target object with said three-dimensional model of said target object.

5. The system of claim 1 wherein one of an image capture or display components of said system comprises a crosshair generator.

6. The system of claim 1 wherein an optical sighting instrument comprising a telescope is used in place of the video camera.

7. A local positioning system, comprising:
a support;
a pan-tilt mechanism carried by said support;
a video camera carried by said pan-tilt mechanism and having a camera coordinate system;
said pan-tilt mechanism is adapted to move said video camera at selected angles with respect to an azimuth axis and at a selected angle of rotation along an elevation axis;
a computer communicating with said video camera and said pan-tilt mechanism;
a target object sighted by said video camera and having a point of interest and a target object coordinate system;
said video camera is adapted to image a plurality of calibration points of known location on said target object;
said computer is adapted to define a relative position and orientation of said video camera with respect to said target object based on said plurality of calibration points, generate a camera pose transformation matrix based on said relative position and orientation, convert position vectors defined in said camera coordinate system into said target object coordinate system, determine a precise position and orientation of said video camera in said target object coordinate system, and determine a position of said point of interest in said target object coordinate system by performing coordinate system transformations using said camera pose transformation matrix;
said computer is adapted to retrieve a three-dimensional model of said target object and display said target object coordinate system and said point of interest on said three-dimensional model of said target object; and
said computer is adapted to indicate locations of previous repairs of said target object on said three-dimensional model of said target object.

8. The system of claim 7 wherein a localization application is programmed into firmware on an ASIC (application specific integrated circuit) or FPGA (field programmable gate array) in place of software from said computer.

9. The system of claim 7 further comprising at least one laser pointer provided on said video camera.

10. The system of claim 7 wherein said computer is adapted to save digital photographs of said previous repairs of said target object with said three-dimensional model of said target object.

11. The system of claim 7 wherein one of an image capture or display components of said system comprises a crosshair generator.

12. The system of claim 7 wherein an optical sighting instrument comprising a telescope is used in place of the video camera.

13. A local positioning method, comprising:
providing a video camera having a camera coordinate system;
said video camera is adapted to pan at selected angles with respect to an azimuth axis and tilt at a selected angle of rotation along an elevation axis;
providing a target object having a target object coordinate system and a plurality of calibration points of known location and a point of interest on said target object;
sighting said video camera on said plurality of calibration points on said target object;
defining a relative position and orientation of said video camera with respect to said target object based on said plurality of calibration points;
generating a camera pose transformation matrix based on said relative position and orientation;
converting position vectors defined in said camera coordinate system into said target object coordinate system;
determining a precise position and orientation of said video camera in said target object coordinate system;
sighting said video camera on said point of interest on said target object;
determining a position of said point of interest in said target object coordinate system by performing coordinate system transformations using said camera pose transformation matrix;
providing a three-dimensional model of said target object and displaying said target object coordinate system and said point of interest on said three-dimensional model of said target object; and
indicating locations of previous repairs of said target object on said three-dimensional model of said target object.

14. The method of claim 13 wherein said step of defining a relative position and orientation of said video camera with respect to said target object comprises utilizing at least three of said calibration points on said target object to define said position and orientation of said video camera with respect to said target object.

15. The method of claim 13 wherein said step of defining a relative position and orientation of said video camera with respect to said target object comprises utilizing five of said calibration points lying on a common plane on said target object to define said position and orientation of said video camera with respect to said target object.

16. The method of claim 13 wherein said step of defining a relative position and orientation of said video camera with respect to said target object comprises utilizing seven of said calibration points on said target object to define said position and orientation of said video camera with respect to said target object.

17. The method of claim 13 wherein said step of defining a relative position and orientation of said video camera with respect to said target object comprises providing a laser and utilizing a distance measurement from said laser to said target object to estimate a distance from said video camera to said calibration points on said target object.

18. The system of claim 13 further comprising the step of saving digital photographs of said previous repairs of said target object with said three-dimensional model of said target object.

19. The system of claim 13 wherein an optical sighting instrument comprising a telescope is used in place of the video camera.

* * * * *